Jan. 5, 1960     D. P. CLAYTON ET AL     2,920,188
SEALED BEAM HEADLAMP MOUNTING
Filed July 29, 1957
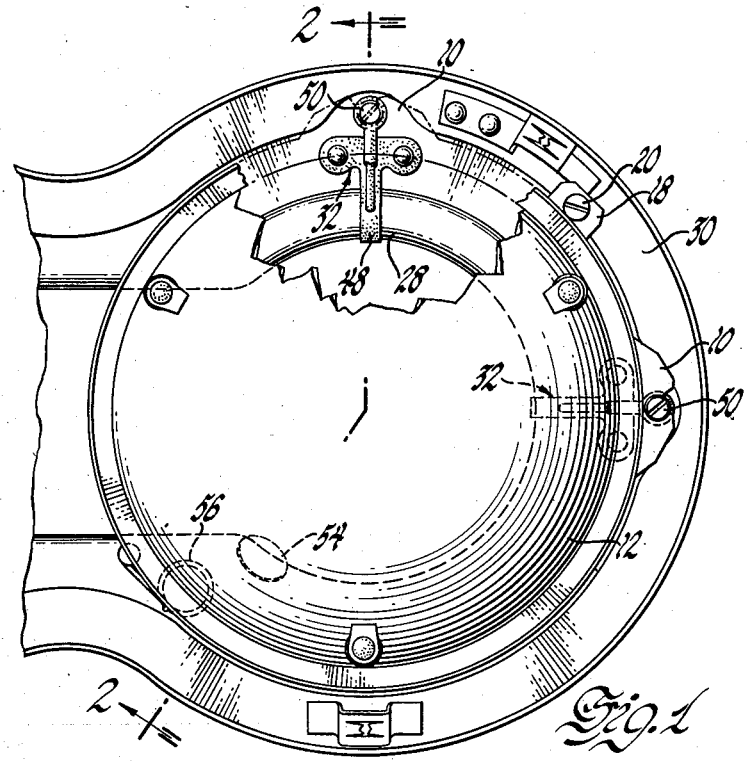
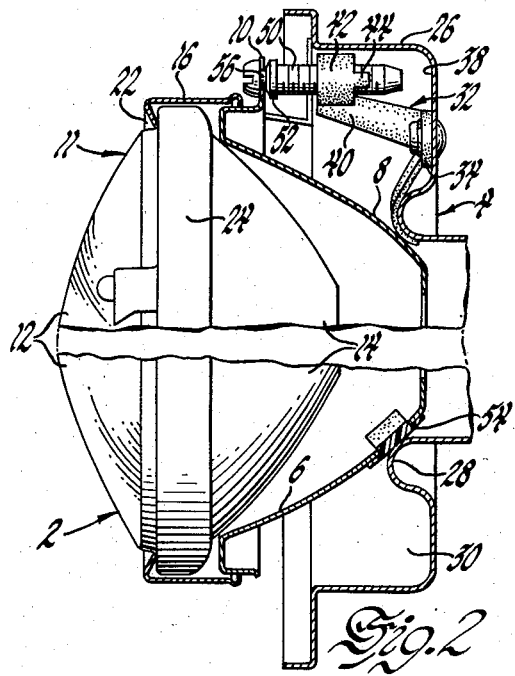
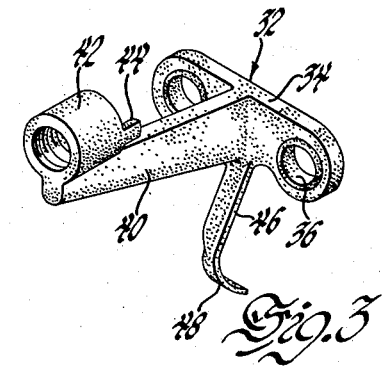
INVENTORS.
David P. Clayton &
BY Robert N. Falge
R. F. Barnard
ATTORNEY.

United States Patent Office 2,920,188
Patented Jan. 5, 1960

2,920,188

SEALED BEAM HEADLAMP MOUNTING

David P. Clayton and Robert N. Falge, Anderson, Ind., assignors to General Motors Corporation, Detroit, Mich., a corporation of Delaware Application July 29, 1957, Serial No. 674,923

2 Claims. (Cl. 240—57)

The present invention relates to a means for adjustably mounting lamp assemblies and, more particularly, to a mounting means for vehicle headlamps of the well-known ball and socket type.

Vehicle headlamp assemblies of the type herein referred to as being of the ball and socket type are generally very well known in the art, and have achieved great commercial acceptance by lamp manufacturers and the purchasing public. A typical type of ball and socket lamp assembly is shown in the U.S. patent issued to Mead No. 2,266,329, and includes a ball member and a socket member and means operatively interconnecting said members for adjustably mounting the ball member in the socket member. The ball member generally includes a sealed beam projection lamp operatively secured within a mounting ring having a spherical bearing surface for adjustable mounting within a socket member formed by a rolled rim on a support. A plurality of fastening means including aiming screws operatively interconnect the mounting ring and support member for the purpose of adjusting the mounting ring within the socket for aiming of the lamp.

It has been considered desirable to form a bearing surface or surfaces on the mounting ring for engagement with the socket member to reduce the area of frictional contact between these members. Moreover, in practice, the bearing portions of the ball and socket members are greased to reduce friction. However, often the proper bearing surfaces are not completely lubricated. Moreover, the grease collects dust and dirt in service which hinders free adjustment of the mounting ring.

It is therefore a general object and feature of this invention to improve the mounting of a lamp assembly of the ball and socket type by providing bearing means between the members of the assembly which will not require any grease for lubrication purposes thereby avoiding the collection of dust, dirt and other materials which heretofore have hindered free adjustment of the lamp.

More specifically, and for the purpose of reducing material handling and simplifying and facilitating the mounting of such a lamp assembly, it is another more specific object and feature of this invention to provide a combined bearing means for the lamp mounting and aiming nut which are formed into an integral bracket which may be secured to the lamp support.

It is another object and feature of this invention to provide an integral bracket adapted to be secured adjacent the socket member of a ball and socket headlamp assembly, which bracket includes a finger forming an anti-friction bearing surface for the mating portions of the ball and socket member, and a nut adapted to adjustably threadably receive an aiming screw operatively connected to the ball member of the assembly.

These and other features, objects and advantages of this invention will appear more fully hereinafter as the description of the invention proceeds, and in which reference is made to the following drawing illustrating a preferred embodiment of the invention.

In the drawings:

Figure 1 is a front elevation, partly broken away, of a vehicle headlamp assembly mounted according to the principles of this invention;

Figure 2 is a broken cross section taken on line 2—2 of Figure 1; and

Figure 3 is a perspective view of a preferred form of the integral mounting bracket utilized in this invention.

Referring now to the drawings, there is shown a vehicle headlamp assembly comprising the ball member 2 and the socket member 4. The ball member 2 includes a cup-shaped mounting ring 6 having a substantially spherical exterior bearing surface 8, and a plurality of radially outwardly projecting ears 10. A lamp 11, herein shown to be of the sealed beam type, includes hermetically sealed lens and reflector elements 12 and 14, respectively. The reflector may have any suitable conformation for directing light rays through the lamp lens, and seats within the interior of the mounting ring 6. A retaining ring 16 includes an ear 18 through which a screw 20 may extend for securing the retaining ring to the mounting ring. Moreover, a radially inwardly bent lip 22 of the retaining ring is adapted to engage an annular flange 24 on the lamp for retaining the latter in the mounting ring. Thus, the ball member 2 of the headlamp assembly includes the mounting ring 6, lamp 11 and retaining ring 16.

The socket member 4 of the assembly includes a supporting housing 26 which, it will be apparent, may be formed within the front fenders of a vehicle. This housing includes an annular rolled rim 28 forming a socket for the mounting ring 6, and an annular channel 30 surrounding the socket forming rim 28.

As is the usual case in such lamp assemblies, suitable means must be provided for adjustably positioning the ball member within the socket member for aiming of the lamp. Such an aiming means usually includes a nut secured to the housing 26 for adjustably receiving an aiming screw operatively connected to the mounting ring. According to a principal feature of this invention now to be described, the aiming and mounting means of this invention incorporates an integral bracket 32 for supporting the aiming nut as well as bearing means interposed between the bearing surfaces of the ball and socket member.

Thus, it will be seen that a substantially T-shaped integral bracket 32, preferably made of nylon, has an arm 34 suitably apertured at 36 for receiving a rivet or other means to secure the bracket to the rear wall 38 of the channel 30. An arm 40 projects forwardly from the arms 34 and perpendicular thereto and mounts at its extreme forward end a nut 42 which is internally threaded. This nut also includes one or more resilient ears 44 projecting axially to the rear of the nut for a purpose to be described more fully hereinafter. Moreover, a bearing finger 46 having a terminal portion 48 wrapped about the rolled rim 28 is also integrally formed and depends from the arm 34. Thus, with the bracket mounted as shown in the drawing, the portion 48 of the bearing finger will be wrapped about the rolled rim and interposed between the latter and the spherical bearing surface 8 of the mounting ring. Suitable aiming screws 50 each have a neck portion 52 seated within a slot in the ears 10 of the mounting ring and are threadably received within the nuts 42 for mounting and aiming the lamp.

For the purpose of this disclosure, it has been found desirable to incorporate two such brackets 32 spaced 90 degrees apart from each other about the lamp assembly. Moreover, a third bearing between the mounting ring and rolled rim socket is provided by a tab 54, again preferably made of nylon, which is seated through an aperture located on the spherical surface 8 of the mounting ring.

As usual, a spring 56 urges the ball member 2 into the socket member 4.

It will therefore be appreciated that the bearing fingers 46 and nylon tab 54 form an anti-friction bearing between the mounting ring 6 and socket 28 and reduce the area of frictional contact therebetween. Thus, the aiming screws 50 may be adjusted against or with the action of the spring 56 to swivel the ball member within the socket.

To prevent disruption of the aim of the lamp due to shocks, vibrations and the like, the nut 42 has been provided with the resilient ears 44 aforementioned. When the nut 42 is initially tapped, the resilient ears, which may be two in number and opposed to each other, will spring away from the nut bore and will be tapped to a depth less than that of the nut bore. Thereafter, when the aiming screw is inserted into the threaded nut bore, it will be resiliently engaged by the tabs to hold it frictionally in the proper position within the bore of the nut.

It will therefore be seen that utilization of the combination fastening and bearing means of this invention in the form of an integral bracket provides a convenient assembly for mounting a lamp of the type aforedescribed, thereby reducing materials to be handled and facilitating the assembly itself. Moreover, the bracket assembly cooperates to assure continued accurate aim of the lamp while providing a novel means for anti-frictionally adjusting and supporting the lamp within its housing.

Having shown one form of the invention for the purpose of illustration only, it is, of course, understood that the invention is to be limited only by the scope of the claims which follow.

We claim:

1. In a headlamp assembly of the ball and socket type comprising a lamp receiving mounting ring having a bearing surface and a support therefor forming a socket for receiving said surface, means for adjustably mounting said mounting ring in said socket; said means comprising a plurality of integral brackets secured to said support adjacent said socket, each of said brackets including an anti-friction bearing finger extending between the bearing surface of said mounting ring and socket, a nut on each of said brackets for adjustably threadably receiving an aiming screw operatively connected to said mounting ring, and an anti-friction bearing material secured to said mounting ring bearing surface and engaging said socket between said brackets.

2. In a headlamp assembly of the ball and socket type, said ball member including a mounting ring having a spherical bearing surface, a support having a rolled rim forming a socket for said mounting ring, an annular channel formed on said support member and surrounding said socket, and means for mounting said mounting ring adjustably within said socket; said mounting means comprising a plurality of integral brackets secured at spaced points within said channel, said brackets each including an antifriction finger extending between and forming a bearing surface for said mounting ring and socket, a nut on each of said brackets for adjustably threadably receiving an aiming screw operatively connected to said mounting ring, and an anti-friction bearing material secured to said mounting ring bearing surface and engaging said socket between said brackets.

References Cited in the file of this patent

UNITED STATES PATENTS

| | | |
|---|---|---|
| 2,043,567 | Worden | June 9, 1936 |
| 2,246,808 | McKechnie | June 24, 1941 |
| 2,304,311 | Luce | Dec. 8, 1942 |
| 2,733,335 | Falge | Jan. 31, 1956 |